United States Patent
Boyer et al.

(10) Patent No.: US 11,585,469 B2
(45) Date of Patent: Feb. 21, 2023

(54) CRIMP FITTING FOR MEDICAL GAS PIPING AND METHOD OF USE

(71) Applicant: RLS LLC, Shelbina, MO (US)

(72) Inventors: Mary C. B. Boyer, Shelbina, IL (US);
Bradley Arment, Shelbina, MO (US);
Sean Kelleher, Shelbina, MO (US);
Tony LaGrotta, Shelbina, MO (US);
Vince Bushell, Shelbina, MO (US);
Michael Duggan, Shelbina, MO (US)

(73) Assignee: RLS LLC, Shelbina, MO (US)

( * ) Notice: Subject to any disclaimer, the term of this patent is extended or adjusted under 35 U.S.C. 154(b) by 305 days.

(21) Appl. No.: 16/246,943

(22) Filed: Jan. 14, 2019

(65) Prior Publication Data

US 2019/0226612 A1    Jul. 25, 2019

Related U.S. Application Data

(60) Provisional application No. 62/724,984, filed on Aug. 30, 2018, provisional application No. 62/652,952, filed on Apr. 5, 2018, provisional application No. 62/619,500, filed on Jan. 19, 2018.

(51) Int. Cl.
*F16L 13/14*    (2006.01)
(52) U.S. Cl.
CPC .......... *F16L 13/142* (2013.01); *F16L 13/143* (2013.01); *Y10T 29/49908* (2015.01)
(58) Field of Classification Search
CPC ..... F16L 13/142; F16L 13/143; F16L 13/147; F16L 13/146; F16L 13/141; F16L 25/01; F16L 33/2073; F16L 13/14; F16L 19/028; F16L 33/207; F16L 33/2071

USPC ...... 285/374, 382.1, 382.2, 382.5, 399, 231, 285/232, 233, 234, 917
See application file for complete search history.

(56) References Cited

U.S. PATENT DOCUMENTS

| | | | |
|---|---|---|---|
| 2,008,650 A | | 7/1935 | Weatherhead |
| 2,258,919 A | * | 10/1941 | Wallace ............... F16L 33/207 |
| 3,030,129 A | * | 4/1962 | Arthur, I |
| 4,192,532 A | * | 3/1980 | Pacella |
| 4,595,053 A | * | 6/1986 | Watkins ..................... 285/382.5 |
| 4,751,965 A | * | 6/1988 | Cassity ...................... 285/382.5 |
| 4,854,030 A | * | 8/1989 | Nishikawa ............ F16L 33/207 |
| 5,040,830 A | | 8/1991 | Atkinson |

(Continued)

OTHER PUBLICATIONS

International Search Report issued by ISA/US in connection with PCT/US2019/13515 dated Jun. 18, 2019.

(Continued)

*Primary Examiner* — Zachary T Dragicevich
*Assistant Examiner* — William S. Choi
(74) *Attorney, Agent, or Firm* — Levenfeld Pearlstein, LLC

(57) ABSTRACT

A crimp fitting has a monolithic and homogeneous female socket configured to receive and be crimped to an end portion of a tube. The socket comprises an annular wall and an axial opening. The annular wall comprises at least one internal shoulder that protrudes radially inward from the annular wall. A seal ring in the female socket has a C-shaped cross section and is configured to be arranged around the end portion of the tube to be joined with the fitting. The C-shaped seal ring compresses against the internal shoulder after the fitting is crimped with the tube with the C-shaped seal ring arranged around the end of the tube.

15 Claims, 12 Drawing Sheets

(56) References Cited

U.S. PATENT DOCUMENTS

| | | | |
|---|---|---|---|
| 5,709,411 A * | 1/1998 | Bank | |
| 5,829,795 A | 11/1998 | Riesselmann | |
| 7,011,345 B2 * | 3/2006 | Foos | 285/231 |
| 7,490,869 B2 * | 2/2009 | Iturralde | 285/374 |
| 9,145,992 B2 | 9/2015 | Arment et al. | |
| 2006/0186664 A1 * | 8/2006 | Huang | F16L 33/2073 |
| 2007/0017688 A1 | 1/2007 | Pyron et al. | |
| 2010/0109319 A1 * | 5/2010 | Zhang | F16L 13/141 |
| 2011/0204624 A1 | 8/2011 | Lawrence | |
| 2014/0197633 A1 | 7/2014 | Nixon et al. | |
| 2016/0101454 A1 * | 4/2016 | Dole | |

OTHER PUBLICATIONS

Written Opinion issued by ISA/US in connection with PCT/US2019/13515 dated Jun. 18, 2019.
International Preliminary Report on Patentability issued by ISA/US in connection with PCT/US2019/13515 dated Jul. 21, 2020.

* cited by examiner

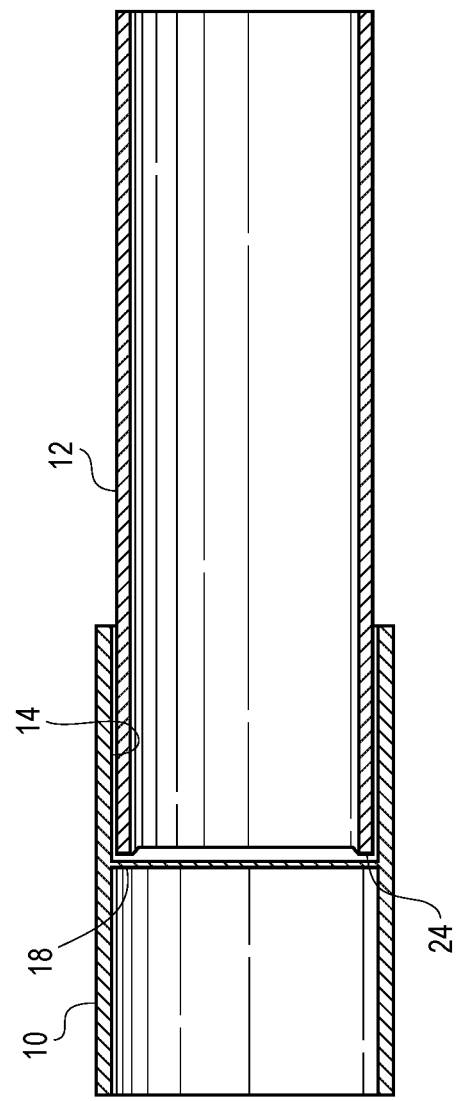

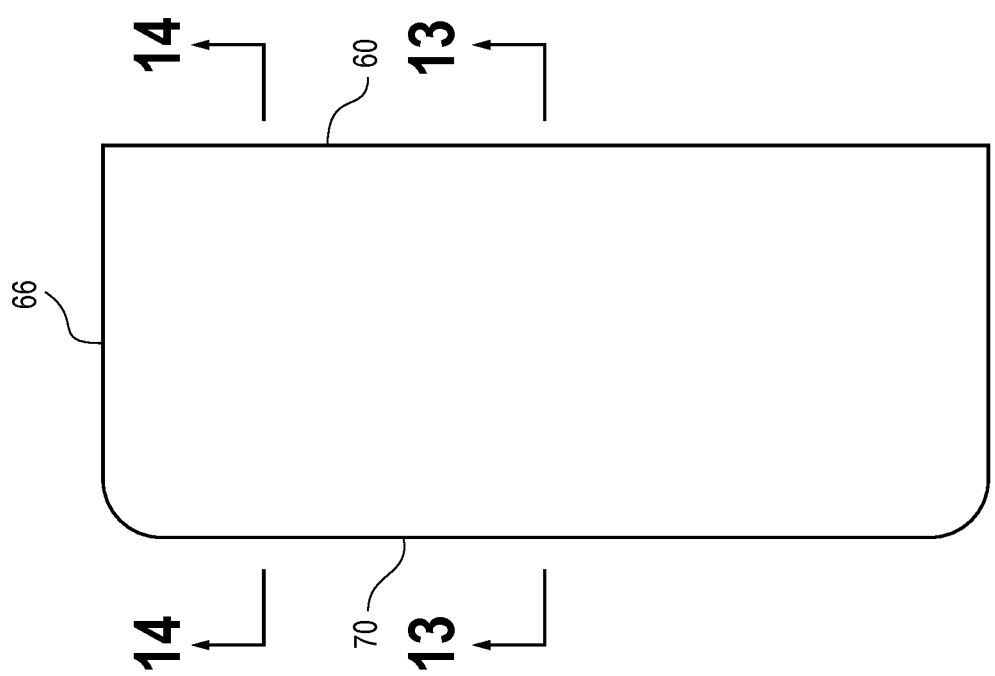

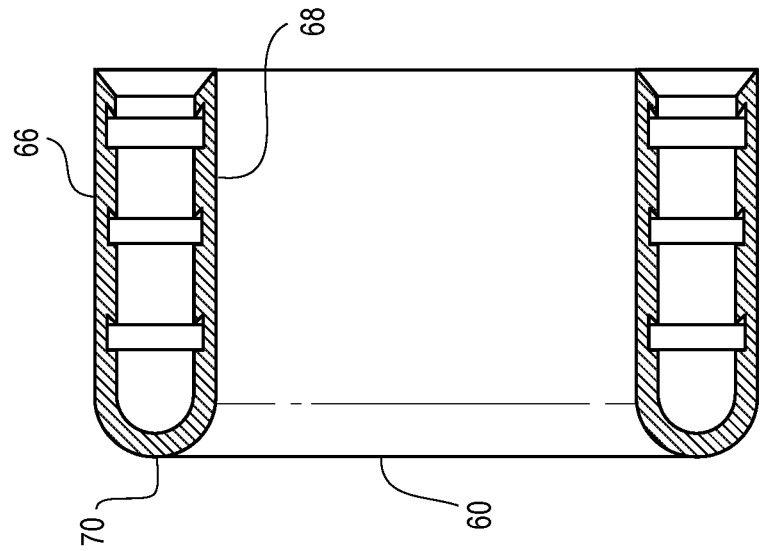
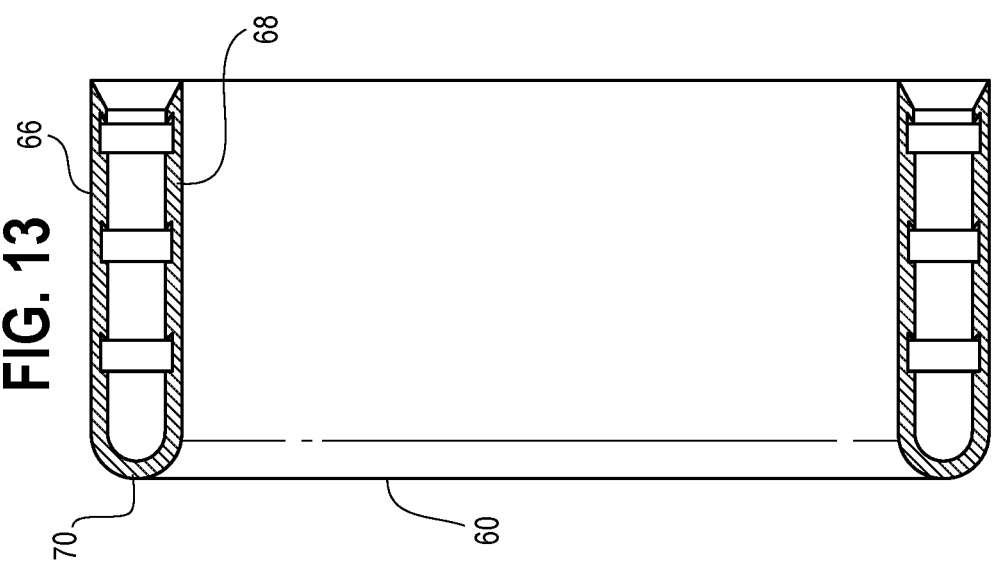

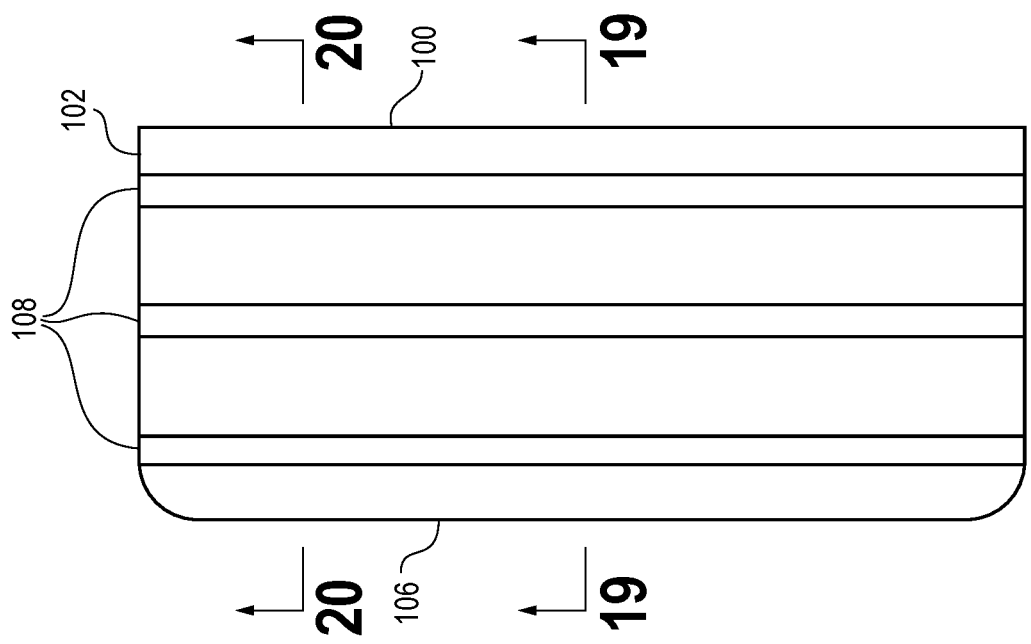

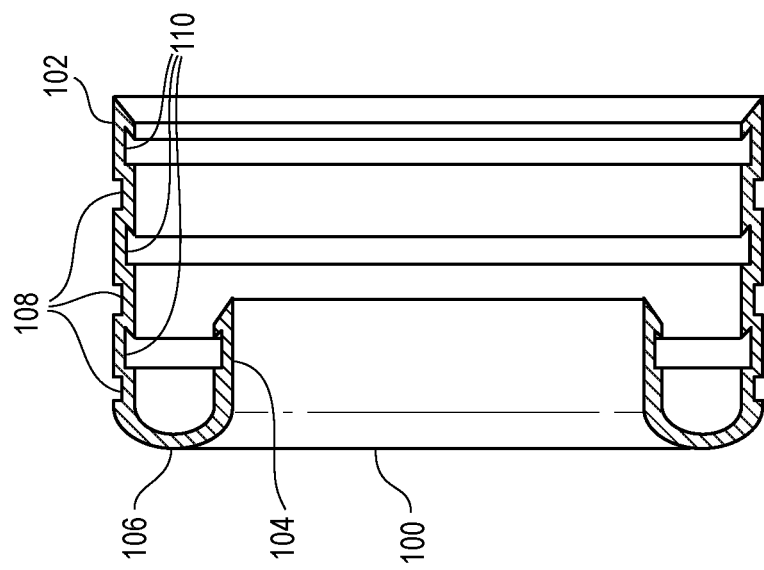
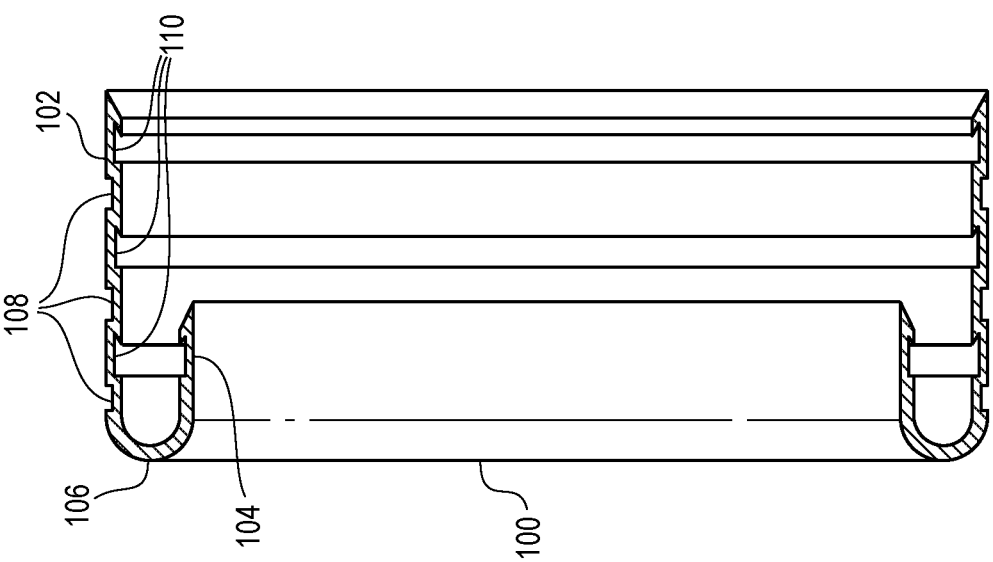

US 11,585,469 B2

CRIMP FITTING FOR MEDICAL GAS PIPING AND METHOD OF USE

CROSS-REFERENCE TO RELATED APPLICATIONS

This application claims the benefit of provisional application Ser. No. 62/619,500, which was filed on Jan. 19, 2018, provisional application Ser. No. 62/652,952, which was filed on Apr. 5, 2018, and provisional application Ser. No. 62/724,984, which was filed on Aug. 30, 2018, the disclosures of which are incorporated by reference herein.

BACKGROUND

As discussed in co-owned U.S. Pat. No. 9,145,992, (which is incorporated by reference herein), metal crimp fittings can be used to join metal tubes together in a manner such that the joints are leak free at gauge pressures in excess of 2,000 psi (13.8 MPa). Such fittings are particularly suited for use in connection with HVAC/refrigeration or plumbing. However, such crimp fittings often rely on the use of O-rings or other types of sealing elements that are not capable of resisting high temperatures. Thus, such fittings are not well suited for use in connection with medical gas, i.e., oxygen piping that is required to withstand a pressure of 300 psi (2.07 MPa) after experiencing temperatures in excess of 1,000° F. (538° C.) for approval testing. At such temperatures, polymeric materials melt and/or become ineffective at maintaining pressure seals.

Medical gas piping is typically required to operate at maximum pressures of less than 100 psi (0.69 MPa). However, because medical gas lines can contain pressurized oxygen, the building codes and specifications require such lines to be capable of withstanding the high temperatures associated with minor fires. Additionally, because at least some of such oxygen is ultimately inhaled, there are typically strict requirements related to the cleanliness of the tubing and joints used in medical gas piping. Thus, the fittings and tubing used must be formed out of materials that can be cleaned and that do not pose any health risks, and that can withstand an oxygen rich environment. The tubes used in medical gas piping are hard drawn copper and the joints are axially swaged/brazed. While conventional brazing techniques can be used to join copper tubes, brazing can have disadvantages. For example, brazing typically involves the use of a torch, which creates an inherent fire risk during installation. This can be problematic or prohibited in situations where tubes need to be joined in buildings while such buildings are open to the public. In addition, a protective gas must be charged into the connection before brazing to prevent oxidization of the interior surfaces and contamination of the medical gas lines. Aspects of the following disclosure overcome these issues.

As discussed below, tubes may to be connected to each other using a crimp fitting and crimping technique rather than a soldering or brazing technique. Moreover, the fitting disclosed below utilizes a metal-to-metal seal that is capable of maintaining pressure seals at pressures in excess of 300 psi (2.07 MPa) and withstanding temperatures in excess of 1000° F. (538° C.). That being said, the fittings, although particularly suited for use in connecting medical gas piping, can also be useful in connecting other types of plumbing such as water lines. The fittings are preferably annealed and used to join hardened tubes.

BRIEF DESCRIPTION OF THE DRAWINGS

FIG. 1 is a top view of an exemplary fitting, which is configured to join two equal diameter tubes to each other.

FIG. 2 is a cross-sectional view of the fitting shown in FIG. 1, taken about the line C-C of FIG. 1.

FIG. 12 is a side view of the seal ring of FIGS. 9-11.

FIG. 13 is a cross-section view of the seal ring taken along lines 13-13 of FIG. 12.

FIG. 14 is a cross-section view of the seal ring taken along lines 14-14 of FIG. 12.

FIG. 18 is a side view of an alternate embodiment of a seal ring.

FIG. 19 is a cross-section view of the seal ring taken along lines 19-19 of FIG. 18.

FIG. 20 is a cross-section view of the seal ring taken along lines 20-20 of FIG. 18.

Figure 3:
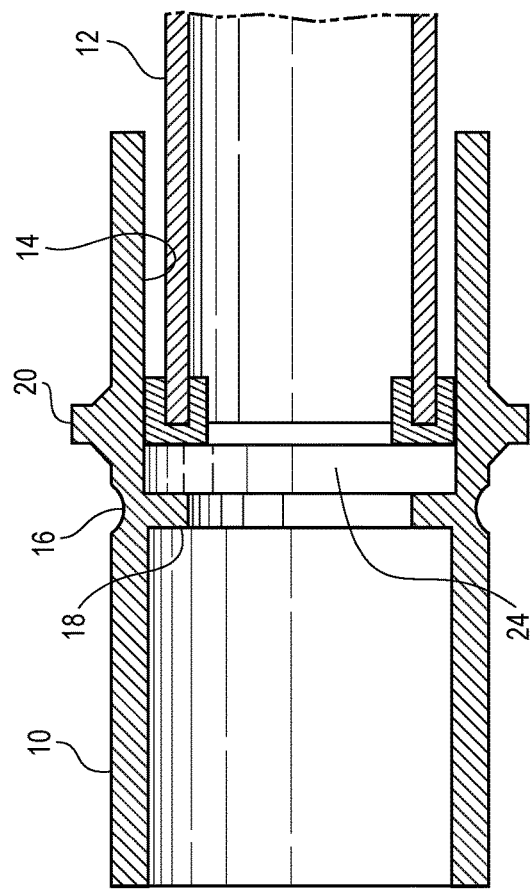
FIG. 3 is a cross-sectional view of another embodiment of a fitting prior to crimping.
Figure 4:
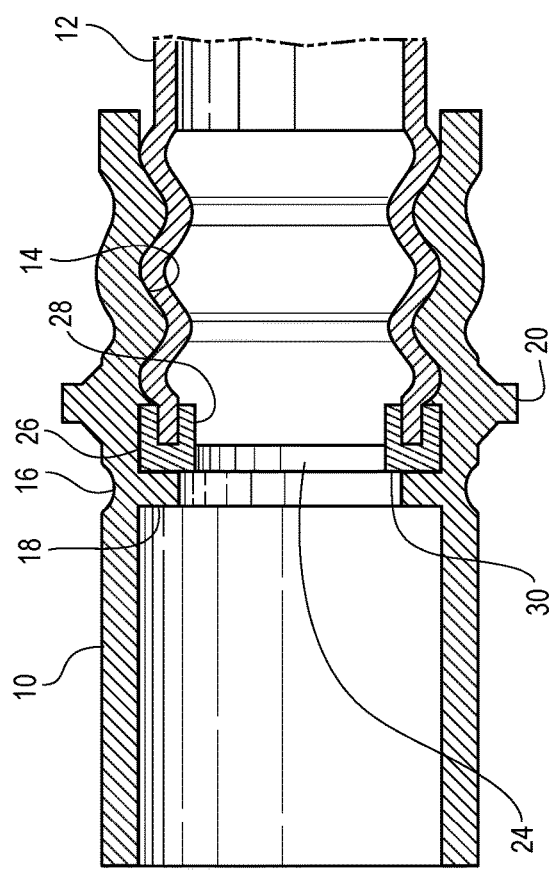
FIG. 4 is a cross-sectional view of the fitting of FIG. 3 after crimping.

Reference numerals in the written specification and in the drawing figures indicate corresponding items.

DETAILED DESCRIPTION

The crimp fitting 10 shown is of the type that is configured to join two equal diameter tubes 12 to each other. However, it should be appreciated that other fittings in accordance with the invention could also be configured to join two or more tubes of differing diameters, or could be an integral portion of the end of a tube that is configured to receive the end of another tube. Thus, the invention is not limited to the particular embodiment of the invention shown in the figures.

Figure 17:
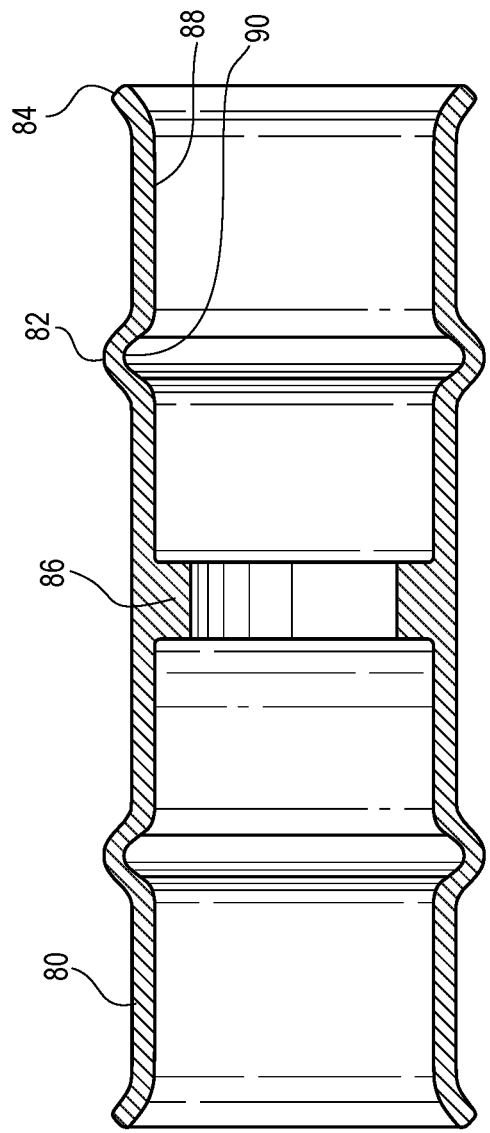
FIG. 17 is a cross-sectional view of an alternate embodiment of a finished fitting.

The fitting 10 is primarily formed via a single monolithic annular wall 14. The annular wall 14 of the fitting forms a female socket in each of its axially opposite halves. The annular wall is preferably formed from a section of cylindrical copper-alloy tubing. The annular wall of the copper fitting is preferably annealed to a soft temper with a grain size between 0.005 mm and 0.070 mm. By way of example and not in any limiting sense, the fitting may be made from a copper, including a material that includes a high amount of copper and small amounts of other alloying elements, for instance and by way of example C11000 copper. A roll form insertion stop 16 may be formed into the annular wall 14 of the fitting at its plane of axial symmetry to form an internal shoulder 18 in the female socket. The internal shoulder may also be formed in the fitting without the roll form outer diameter feature (FIG. 17). Instead of a roll from insertion stop, a dimple insertion stop, or a series of dimples may be press-formed into the annular wall of the fitting at its plane of axial symmetry to form an internal shoulder in the female socket. The female socket may have a flare (FIGS. 15,17) on its outer distal end to facilitate insertion of a tube to be joined with the fitting. The flare may extend from a cylindrical portion of the respective socket and flares radially outward to the distal end of the fitting as it extends to the opening of the socket. The outer diameter of the fitting may have one or more locating surfaces 20 to facilitate optimum placement of a crimping tool on the fitting. One locating surface may be provided adjacent to the distal end of the fitting and another locating surface may be at distance from the first corresponding to the size of the jaw of the crimping tool. The locating surface(s) 20 and/or the flare may be formed using a spin form or ram form technique.

A seal ring 24 having a C-shaped cross section may be provided. The C-shaped cross section of the seal ring corresponds to the inner and outer diameter of the tube 12 to be connected with the fitting. Thus the C-shaped seal ring 24 may be arranged around the end of the tube 12 to be inserted into the female socket of the fitting. The radially outer portion 26 of the C-shaped cross section may be placed supercircumjacent the outer diameter surface of the tube, the radially inner portion 28 of the C-shaped cross section may be placed subcircumjacent the inner diameter surface of the tube, and the inner axial face 30 of the C-shaped cross section may be placed adjacent to the axial face of the end of the tube. At least one portion of the C-shaped cross section may have a tight slip fit with the end of the tube. For instance, the seal ring may be dimensioned such that only the radially outer portion of the C-shaped cross section has a tight slip with the outer diameter surface of the tube, and the radially inner portion of the C-shaped cross section is spaced from the inner outer diameter surface of the tube. The opposite arrangement may also be provided. The axially lengths of the radially outer and inner portions of the C-shaped cross section may be the same or different. For instance as shown in FIGS. 2-4, 9-14, and 16, the radially outer and inner portions of the C-shaped cross section are generally the same, whereas in FIGS. 18-20, the axial length of the radially outer portion of the C-shaped cross section is longer than the axial length of the radially inner portion of the C-shaped cross section. The C-shaped seal ring may be provided in the female socket of the fitting, so that when the tube is inserted in the fitting, the end of the tube fits into the C-shaped cross section of the fitting. In the alternative, the C-shaped seal ring may be placed on the end of the tube and then inserted into the female socket of the fitting. The seal ring may be made from an alloy compatible with the copper alloy used in the tube and fitting, and medical gases. For instance, the seal ring may be made from Inconel 718. The seal ring may also be made from a copper, including a material that includes a high amount of copper and small amounts of other alloying elements, for instance and by way of example C11000 copper or C12200 copper. By way of example and not in any limiting sense brass alloys may be used. The sealing ring may be made from a material having a hardness equal to or greater than the hardness of the material of the female socket. The sealing ring may also be made from a material having a hardness less than or equal to the hardness of the material of the female socket.

With C-shaped cross section of the seal ring 24 arranged around the end of the tube 12 and the tube in the female socket, the seal ring together with the tube may be arranged adjacent to the internal shoulder 18 (i.e. the roll form stop or the dimple stop) to fix the C-shaped seal ring against the shoulder and prevent its axial motion. The seal ring may be placed on the end of the tube and the tube with the seal ring may be inserted into the female socket to locate the seal ring against the internal shoulder, or the tube may be inserted into the female socket such that the end of the tube locates the surfaces of the C-shaped seal ring already disposed in the female socket against the internal shoulder. Thereafter, the fitting may be crimped. In addition to locking the fitting with the tube through radial deformation of the fitting and the tube, the fitting and the tube also deforms axially. So as the tube is crimped, the tube deforms axially in the female socket, and drives, compresses and/or deforms the C-shaped seal ring against the internal shoulder thereby firmly mechanically securing the tube in the fitting. The crimping process is preferably performed in a generally uniform manner, as is described in U.S. Pat. No. 9,145,992. The crimping also causes the crimped portion of the annular wall to work harden. Because the fitting is initially annealed and work hardens during the crimping process and the end portion of the tube and the seal ring is fully hard, after crimping, the necked-in portion of the end portion of the tube will remain radially biased against the annular wall with a radial compression force that creates a pressure seal sufficient to withstand a pressure differential in excess of 300 psi (2.07 MPa). Likewise the seal ring remains biased against the shoulder and fitting. It should also be appreciated that the crimping creates interlocking geometry between the fitting 10 and the end portion of the tube that prevents the end portion of the tube from thereafter pulling axially out of the fitting.

Figure 5:
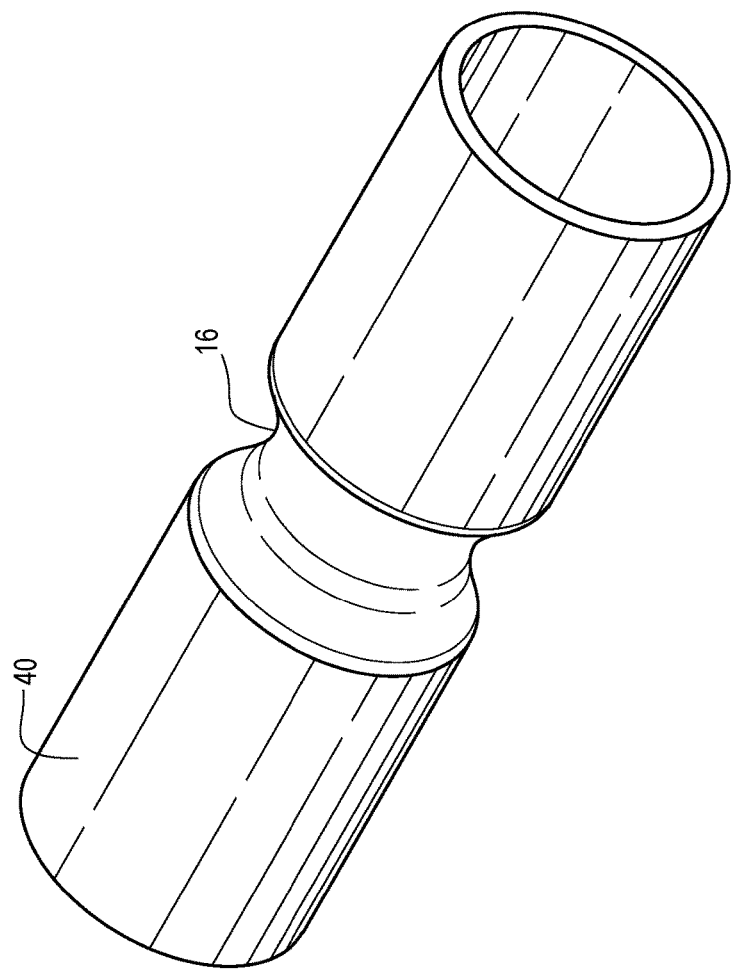
FIG. 5 is a perspective view of an embodiment of a semi-finished fitting before forming into a final fitting.
Figure 6:
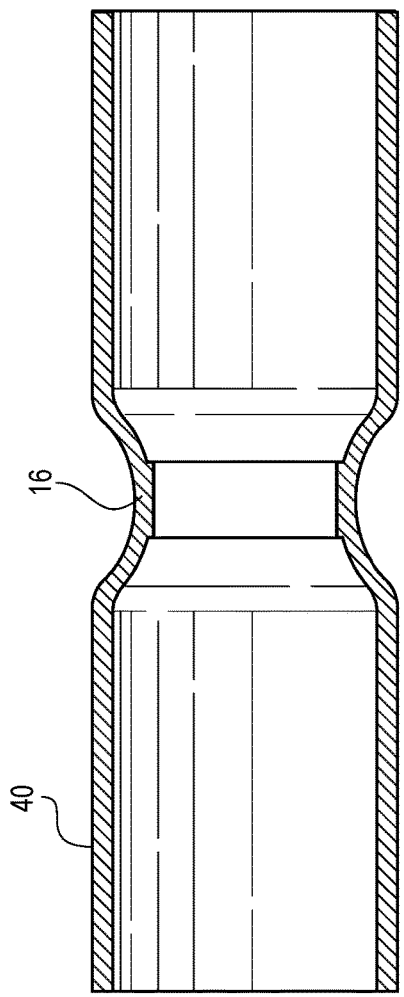
FIG. 6 is a cross-sectional view of the semi-finished fitting of FIG. 5.
Figure 7:
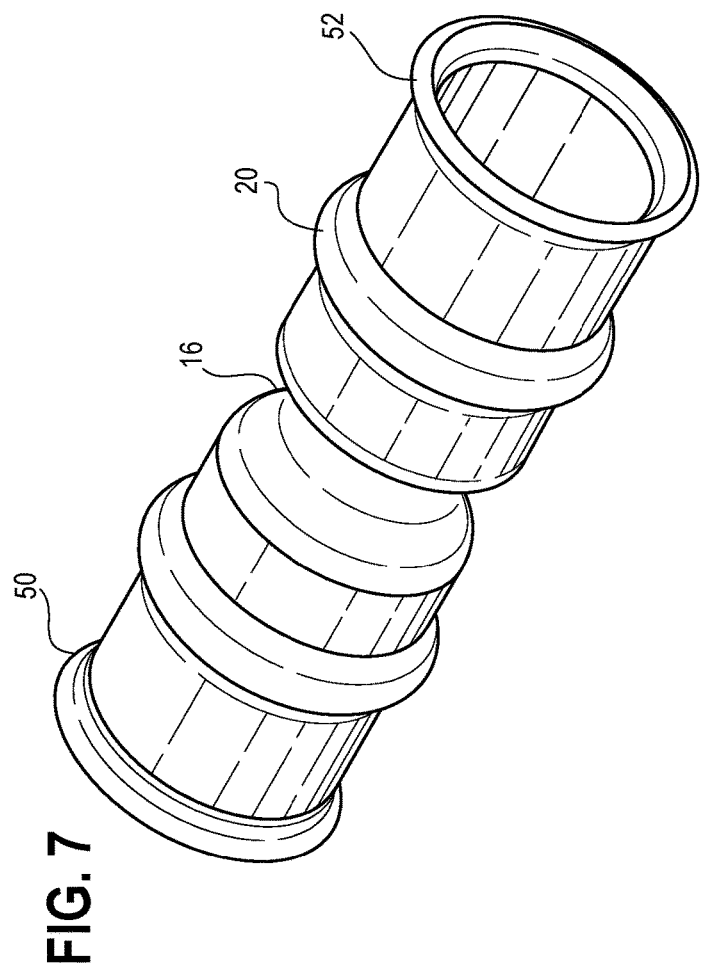
FIG. 7 is a perspective view of an embodiment of a fitting after forming the semi-finished fitting of FIG. 5.
Figure 8:
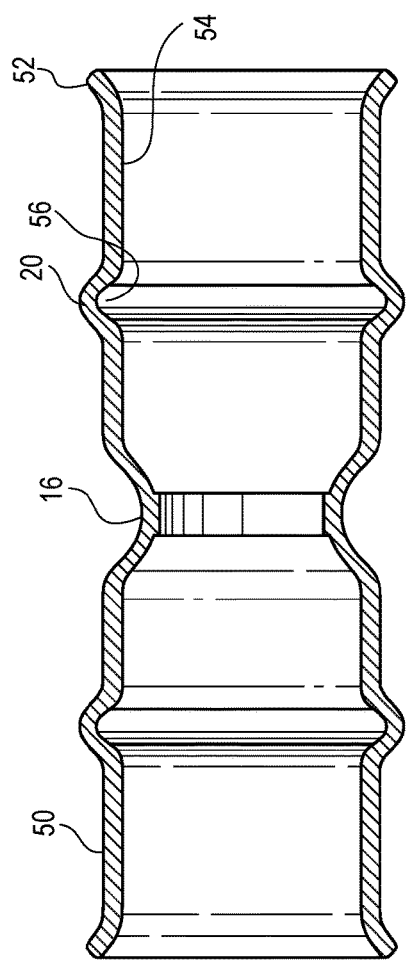
FIG. 8 is a cross-sectional view of the finished fitting of FIG. 7.
Figure 11:
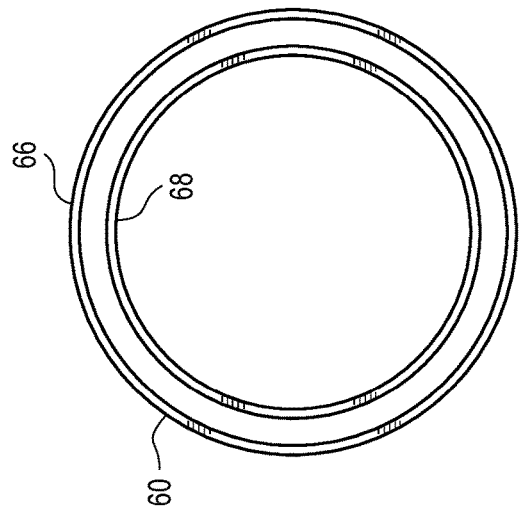
FIGS. 9-11 show views of an embodiment of a seal ring that may be used in the fitting of FIGS. 7-8.
Figure 9:
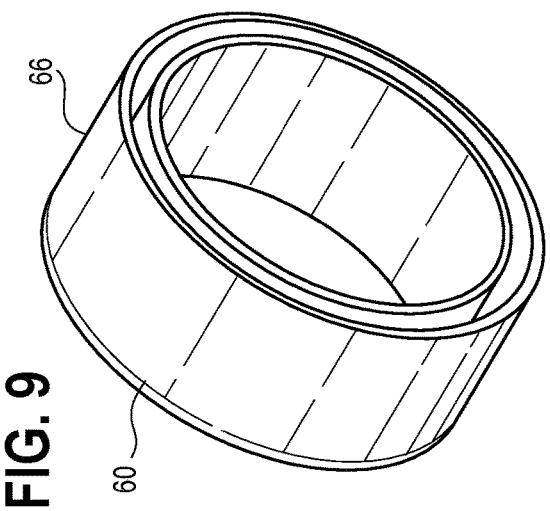
Figure 10:
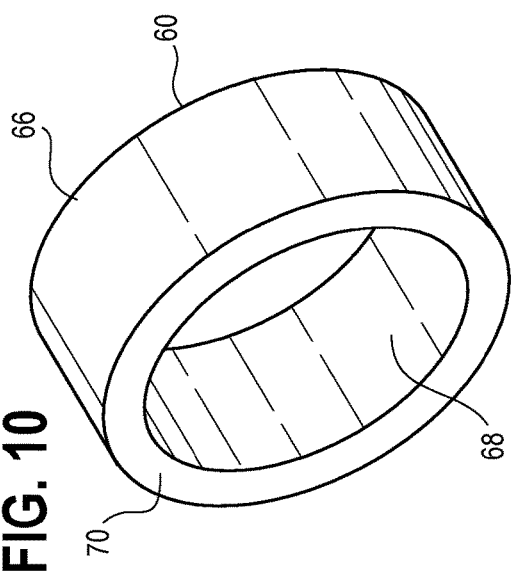

FIGS. 5 and 6 show embodiment of a blank 40 that may be used in processing to produce a fitting 50, for instance, as shown in FIGS. 7 and 8. As described above, the blank may be processed in a spin form or ram form type of process to produce the fitting 50. The fitting 50 may have flares 52 on its distal ends at that lead into the female socket portion 54 of the fitting. Additionally, the fitting 50 may be provided with an O ring groove 56 in the female socket 54 intermediate of the distal end flare 52 and the insertion stop 16. The O-ring groove may extend beyond the outer diameter surface of the fitting to form a locator 20. The area on the outer diameter surface of the fitting between the locator and the distal end flare may provide a surface for placing a crimp tool for crimping. The flare 52 may be replaced with an annular protrusion.

FIGS. 9-12 show an embodiment of a seal ring 60. The seal ring 60 has a generally C-shaped cross-sectional area that may be arranged around the end of a tube and inserted into the female socket of the fitting. The radial outer portion 66 of the C-shaped cross-section may be placed supercircumjacent the outer diameter surface of the tube and the radial inner portion 68 of the C-shaped cross-section may be placed subcircumjacent the inner diameter surface of the tube. As shown in the drawings, the radial outer portion 66 and radial inner portion 68 of the C-shaped cross-section have approximately the same axial length and extend from the axial face 70 of the C-shaped cross-section an equal amount.

Making reference to FIGS. 13 and 14, a cross-sectional view of the C-shaped cross-section ring 60 is shown. The seal ring 60 includes grooves 72 formed in the radial outer portion 66 and the radial inner portion 68 of the C-shaped cross-section. The grooves 72 provide a locking effect on the end of the tube when the end of the tube is fitted within the C-shaped cross-section of the seal ring 60. The crimping process causes the edges of the grooves 72 to bite into to the end of the tube to create a more secure fit between the tube and the seal ring and the seal ring and the fitting.

Figure 15:
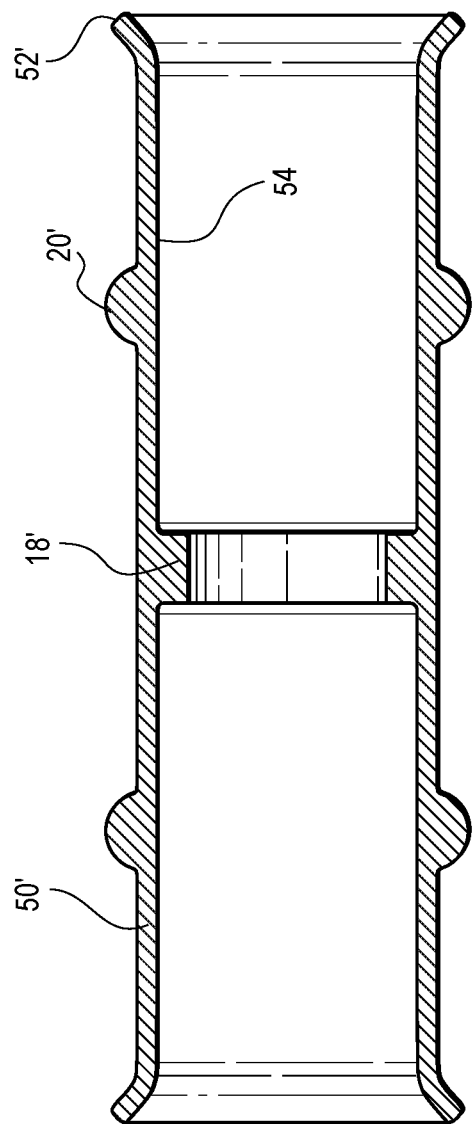
FIG. 15 is a cross-sectional view of another embodiment of a fitting.
Figure 16:
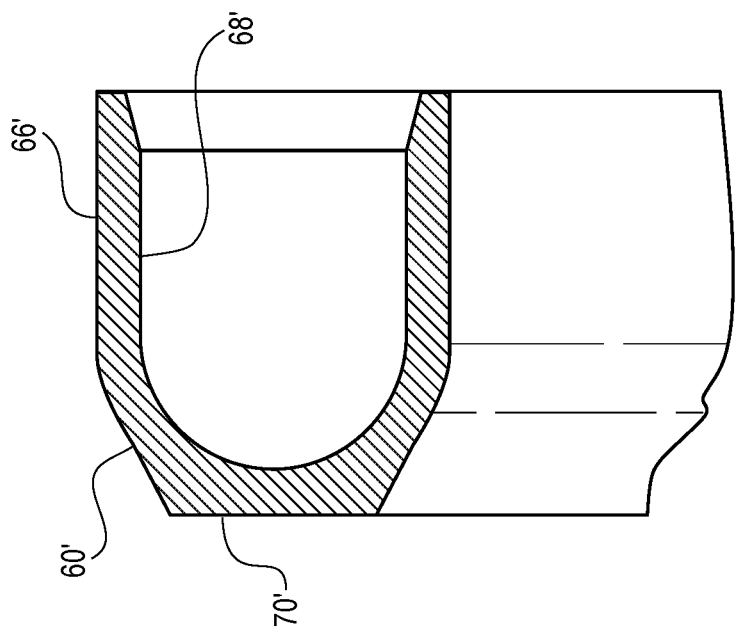
FIG. 16 is a cross-sectional view of another embodiment of a seal ring.

FIG. 15 shows another exemplary fitting 50' with a generally cylindrically shaped exterior shape and having the locator surface 20' and the flared end 52' projecting outward from the exterior shape of the fitting. The fitting 50' also has a generally cylindrically shaped interior shape with an internal shoulder 18' projecting inward in the female socket portion 54' and axially spaced from the flared end 52'. FIG. 16 shows another exemplary seal ring 60' that may be used with the fitting 50' of FIG. 15. The seal ring 60' has a generally C-shaped cross-sectional area that may be arranged around the end of a tube and inserted into the female socket of the fitting. The radial outer portion 66' of the C-shaped cross-section may be placed supercircumjacent the outer diameter surface of the tube and the radial inner portion 68' of the C-shaped cross-section may be placed subcircumjacent the inner diameter surface of the tube. As shown in the drawings, the radial outer portion 66' and radial inner portion 68' of the C-shaped cross-section have approximately the same axial length and extend from the axial face 70 of the C-shaped cross-section an equal amount. A lead in chamfer may be provided to allow the tube wall to be more easily received between the radial outer portion 66' and radial inner portion 68' of the C-shaped cross-section.

FIG. 17 shows another exemplary fitting 80 with a generally cylindrically shaped exterior shape and having the locator surface 82 and the flared end 84 projecting outward from the exterior shape of the fitting. The fitting 80 also has a generally cylindrically shaped interior shape with an internal shoulder 86 projecting inward in the female socket portion 88 and axially spaced from the flared end 84. The fitting is also provided with an O-ring groove type feature 90. During manufacturing of the fitting, formation of the O-ring feature 90 also provides the locator surface 82. The wall thickness around the locator surface 82 and O-ring groove feature 90 may be less than the wall thickness of the female socket portion 88 of the fitting. The lower wall thickness around the O-ring groove feature 90 assists in generating axial expansion of the fitting during the crimping process to increase the mechanical bond formed between the fitting and the tube after crimping. It may be unnecessary to use an O-ring in the O-ring groove feature 90.

FIG. 18 shows another exemplary seal ring 100 that may be used with the fitting 80 of FIG. 17. The seal ring 100 has a generally C-shaped cross-sectional area with that may be arranged around the end of a tube and inserted into the female socket of the fitting. The C-shaped cross section of the fitting 100 of FIG. 18-20 is such that the axial length of the radially outer portion 102 of the C-shaped cross section is longer than the axial length of the radially inner portion 104 of the C-shaped cross section. The radial outer portion 102 of the C-shaped cross-section may be placed supercircumjacent the outer diameter surface of the tube and the radial inner portion 104 of the C-shaped cross-section may be placed subcircumjacent the inner diameter surface of the tube. As shown in the drawings, the radial outer portion 102 projects from the axial face 106 of the C-shaped cross a greater amount than the radial inner portion 104 of the C-shaped cross-section. A lead in chamfer may be provided to allow the tube wall to be more easily received between the radial outer portion 102 and radial inner portion 104 of the C-shaped cross-section. The radially outer portion and/or radially inner portion of the C-shaped cross section may be dimensioned to have a press fit with the end portion of the tube. The seal ring 100 may include outer diameter grooves 108 formed in the radial outer portion 102. The grooves 18 provide a locking effect on the seal ring 100 in the female socket 88 of the fitting 80. The crimping process causes the edges of the grooves 108 to bite into to the female socket 88 of the fitting 80 to create a more secure fit between the seal ring (and the end the tube) and the fitting. The seal ring 100 may include inner diameter grooves 110 of the radially outer portion 102 and/or radially inner portion 104 of the C-shaped cross-section. The inner diameter grooves 110 provide a locking effect on the end of the tube when the end of the tube is fitted within the C-shaped cross-section of the seal ring 100. The crimping process causes the edges of the grooves 110 to bite into to the end of the tube to create a more secure fit between the tube and the seal ring and the seal ring and the fitting.

In view of the foregoing, it should be appreciated that aspects of the disclosure achieve several advantages over prior art fittings. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A crimp fitting comprising a monolithic and homogeneous female socket configured to receive and be crimped to an end portion of a tube, the socket comprising an annular wall and an axial opening, the annular wall comprising a roll form insertion stop formed in an outer surface of the annular wall to define an internal shoulder that protrudes radially inward from the annular wall, and a seal ring in the female socket, the seal ring having a C-shaped cross section, the C-shaped cross section includes a radially outer portion that surrounds an outer diameter of the end portion of the tube to be joined with the fitting, and a radially inner portion that extends within an inner diameter of the end portion of the tube to be joined with the fitting, the seal ring abutting a side of the internal shoulder, and
    wherein the radially outer portion of the C-shaped cross section has an axial length and wherein the radially inner portion of the C-shaped cross section has an axial length equal to the radially outer portion of the C-shaped cross section axial length, and
    wherein the axial length of the radially inner portion of the C-shaped cross section and the axial length of the radially outer portion of the C-shaped cross section are less than an axial length of the annular wall,
    wherein when the crimp fitting is crimped onto the end portion of the tube a crimp formed thereby is axially spaced from the seal ring.

2. The fitting of claim 1 wherein the seal ring is made from a copper based material.

3. The fitting of claim 1 wherein the female socket is formed of a metal comprising a copper alloy and the female socket is in an annealed condition.

4. The fitting of claim 1 wherein the female socket includes an O-ring groove.

5. The fitting of claim 1 wherein the radially outer portion of the C-shaped cross section is dimensioned to have a press fit with the end portion of the tube.

6. The fitting of claim 1 wherein the radially inner portion of the C-shaped cross section is dimensioned to have a press fit with the end portion of the tube.

7. The fitting of claim 1 wherein the radially outer portion of the C-shaped cross section is dimensioned to have a press fit with the female socket of the fitting.

8. The fitting of claim 1 wherein an inner diameter surface of the radially outer portion of the C-shaped cross section has grooves.

9. A method of crimping a monolithic and homogeneous female socket portion of a crimp fitting to an end portion of a hardened tube, the method comprising:
providing the crimp fitting having the socket portion comprising an annular wall and an axial opening, the annular wall comprising a roll form insertion stop formed in an outer surface of the annular wall to define an internal shoulder that protrudes radially inwardly from the annular wall, and a seal ring in the female socket, the seal ring having a C-shaped cross section, the C-shaped cross section including a radially outer portion that surrounds an outer diameter of the end portion of the tube to be joined with the fitting, and a radially inner portion that extends within an inner diameter of the end portion of the tube to be joined with the fitting, the seal ring abutting a side of the internal shoulder, the radially outer portion of the C-shaped cross section having an axial length and the radially inner portion of the C-shaped cross section having an axial length equal to the radially outer portion of the C-shaped cross section axial length and the axial length of the radially inner portion of the C-shaped cross section and the axial length of the radially outer portion of the C-shaped cross section are less than an axial length of the annular wall;
inserting the end portion of the tube into the socket portion of the crimp fitting through the axial opening of the socket portion, such that the end portion of the tube is coaxial to the annular wall; and thereafter
crimping the socket portion of the crimp fitting in a manner such that an innermost diameter of the annular wall reduces and contacts the end portion of the tube in a manner creating a permanent necked-in region in the end portion of the tube, the crimping also occurring in a manner such that, when the crimping is completed, the necked-in region in the end portion of the tube and the annular wall remain radially compressed against each other with the seal ring compressed against the internal shoulder in the female socket portion, and wherein when the crimp fitting is crimped onto the end portion of the tube a crimp formed thereby is axially spaced from the seal ring.

10. The method of claim 9 wherein the step of arranging the seal ring having the C-shaped cross section around the end portion of the tube includes the seal ring made from a copper based material.

11. The method of claim 9 wherein the step of arranging the seal ring having the C-shaped cross section around the end portion of the tube includes the seal ring having a hardness greater than the fitting.

12. The method of claim 9 wherein the seal ring is arranged in the female socket before the tube is inserted in the female socket.

13. The method of claim 9 wherein the step of arranging the seal ring having the C-shaped cross section around the end portion of the tube includes providing the radially outer portion of the C-shaped cross section to have a press fit with the end portion of the tube.

14. The method of claim 9 wherein the step of arranging the seal ring having the C-shaped cross section around the end portion of the tube includes providing the radially inner portion of the C-shaped cross section to have a press fit with the end portion of the tube.

15. The method of claim 9 wherein the step of arranging the seal ring having the C-shaped cross section around the end portion of the tube includes providing the radially outer portion of the C-shaped cross section to have a press fit with the female socket of the fitting.

* * * * *